United States Patent [19]

Kanamori et al.

[11] Patent Number: 5,055,121
[45] Date of Patent: Oct. 8, 1991

[54] METHOD FOR PRODUCING GLASS PREFORM FOR OPTICAL FIBER

[75] Inventors: Hiroo Kanamori; Yoichi Ishiguro; Gotaro Tanaka, all of Yokohama, Japan

[73] Assignee: Sumitomo Electric Industries, Ltd., Osaka, Japan

[21] Appl. No.: 560,024

[22] Filed: Jul. 27, 1990

Related U.S. Application Data

[63] Continuation of Ser. No. 251,845, Oct. 3, 1988, abandoned.

[30] Foreign Application Priority Data

Oct. 7, 1987 [JP] Japan ................................ 62-251573

[51] Int. Cl.⁵ .................... C03B 37/018; C03B 37/014
[52] U.S. Cl. ....................................... 65/3.12; 65/18.2; 65/900; 65/DIG. 16
[58] Field of Search ................. 65/3.12, 900, 18.2, 65/3.11, DIG. 16

[56] References Cited

U.S. PATENT DOCUMENTS

| | | | |
|---|---|---|---|
| 4,157,906 | 6/1979 | Bailey | 65/900 |
| 4,286,978 | 9/1981 | Bailey | 65/3.12 |
| 4,304,583 | 12/1981 | Aronson | 65/3.12 |
| 4,402,720 | 9/1983 | Edahiro | 65/3.12 |
| 4,610,709 | 9/1986 | Kawauchi | 65/DIG. 16 |
| 4,693,738 | 9/1987 | Hoshikawa | 65/3.12 |

FOREIGN PATENT DOCUMENTS

| | | |
|---|---|---|
| 0151438 | 1/1985 | European Pat. Off. . |
| 5503365 | 1/1980 | Japan ................................ 65/900 |
| 57-27934 | 2/1982 | Japan . |
| 59-83953 | 5/1984 | Japan . |
| 60-251142 | 12/1985 | Japan . |
| 61-174138 | 8/1986 | Japan . |
| 61-201637 | 9/1986 | Japan . |

*Primary Examiner*—Kenneth M. Schor
*Attorney, Agent, or Firm*—Cushman, Darby & Cushman

[57] ABSTRACT

An optical fiberglass preform having fluorine selectively added to its cladding is produced by:
depositing soot of quartz glass on a pipe from starting member by using burners for synthesizing glass soot to form a porous glass preform consisting of a core porous glass body a peripheral portion of which has a larger bulk density than the other portion and a cladding porous glass body,
heating said porous glass preform in a dehydration atmosphere while supplying dehydration gas through the pipe form starting member and
heating and vitrifying the dehydrated porous glass preform in an atmosphere containing a fluorine-containing compound.

2 Claims, 7 Drawing Sheets

METHOD FOR PRODUCING GLASS PREFORM FOR OPTICAL FIBER

This is a continuation of application No. 07/251,845, filed on Oct. 3, 1988, which was abandoned upon the filling hereof.

BACKGROUND OF THE INVENTION

1. Field of the Invention

The present invention relates to a method for producing a glass preform for use in the fabrication of an optical fiber. More particularly, the present invention relates to a method for producing a fluorine-containing glass preform in which fluorine is selectively added to a cladding part by the VAD (vapor phase axial deposition) method, particularly to improvement of a dehydration step.

The method according to the present invention is advantageous for producing a glass preform to be used in the fabrication of an optical fiber which is used in long distance optical communication or in a radiation filled atmosphere.

2. Description of the Related Art

Generally, an optical fiber comprises a core through which light propagates and a cladding which surrounds the core and has a refractive index lower than that of the core. In a quartz ($SiO_2$) glass base optical fiber, a refractive index difference between the core and the cladding is formed by the addition of an additive which increases the refractive index of the glass to the core and/or by the addition of an additive which lowers the refractive index of the glass to the cladding.

Fluorine is an additive which can lower the refractive index of the quartz glass without adversely affecting transmissionlose characteristics of the optical fiber. When the additive which increases the refractive index (e.g. $GeO_2$) is added to the core, transmission loss due to Rayleigh scattering or transmission loss in the presence of radiation is increased. Therefore, it has been tried to produce an optical fiber in which an amount of the refractive index-increasing additive to be added to the core is decreased, ideally to zero while decreasing the refractive index of the cladding by the addition of fluorine to the cladding, and various methods for producing such optical fiber have been proposed.

One of such proposed methods comprises forming a porous glass preform (soot preform) comprising a core part and a cladding part which correspond to the core and the cladding of the optical fiber, respectively by using a plural number of burners for synthesizing glass soot, subjecting the soot preform to a fluorine-addition treatment such as heating of the soot preform in an atmosphere comprising a fluorine-containing compound to add fluorine to the cladding part, and then heating the soot preform at a high temperature to make it transparent to obtain a transparent glass preform consisting of a core part made of $SiO_2$ glass and a cladding part made of a fluorine-added $SiO_2$ glass. In this method, since both the core and cladding parts are porous, fluorine tends to be uniformly added to both parts, so that it is very difficult to selectively add fluorine to the cladding part.

In another proposed method, as shown in FIG. 1, a burner 106 for sintering the core part is provided between a burner 104 for forming the core part and a burner 105 for forming the cladding part, and immediately after a porous glass body of the core part 102 is synthesized around a peripheral surface of a starting glass rod 101 by the burner 104, it is heated by the burner 106 to increase its bulk density. Thereafter, a porous glass body of the cladding part 103 is synthesized on the core part by the burner 105 to obtain a porous preform in which a density of the core part has been suitably adjusted. Thereby, during the addition of fluorine to the cladding part, diffusion and addition of fluorine to the core part are prevented, so that a glass preform having desired refractive index profile is produced (cf. Hanawa, et al, "Fabrication of Pure Silica Core Fibers by VAD Method", Denkitsushin Gakkai Ronbunshi, Vol. J68-C, No. 8, 597-604 (1985)). In FIG. 1, an upper arrow and a circular arrow indicate directions of pulling up and rotating the starting member, respectively. By the way, the addition of fluorine to the porous glass body closely relates to the bulk density of the porous glass body. The bulk density at which fluorine is easily added is said to be at most about 0.5 $g/cm^3$. By this method, a bulk density of the surface part of the core part glass body but not of the whole core part is increased up to bout 2.0 $g/cm^3$. Therefore, the addition of fluorine into the core part is prevented by the surface part having the large bulk density.

According to the above described method in which the bulk density of the surface portion of the core part porous glass body is adjusted, the core-cladding porous glass body can be produced in one step, and the addition of fluorine to the core part is prevented. However, a dehydration gas such as chlorine-containing gas hardly penetrates into the core part, and the dehydration gas cannot reach the center portion of the core part.

Light absorption caused by OH groups due to residual water in the glass has a peak around a wavelength of 1.39 $\mu$m, it has influences on light transmission in a 1.30 or 1.55 $\mu$m wavelength band and results in increase of transmission loss. Therefore, dehydration of the core part is very important.

In the above described method, after the formation of the core-cladding porous glass body, dehydration is effected and then fluorine is added. To decrease the amount of the OH groups to such a level that the transmission loss at a wavelength of 1.39 $\mu$m is decreased to 10 dB/km or less, namely the light transmission in a 1.55 $\mu$m band is not influenced, dehydration should be continued for 200 hours or longer (see page 602, FIG. 12 of Hanawa et al, supra.).

In contrast to the other conventional methods for producing the glass preform in which the dehydration is completed in about 2 hours and he OH group content can be reduced to a level at which the transmission loss at the wavelength of 1.39 $\mu$m is 1 to 2 dB/km, the above described method has poor productivity and is not practically employed.

SUMMARY OF THE INVENTION

An object of the present invention is to provide a method for producing a glass preform for an optical fiber in which a core-cladding porous preform is produced and thoroughly dehydrated, and fluorine can be selectively added to the cladding part of the preform.

This and other objects of the present invention are accomplished by a method for producing a glass preform for an optical fiber, which comprises the steps of:

depositing soot of quartz glass on a pipe form starting member by using a plural number of burners for synthesizing glass soot to form a porous glass preform consisting of a core part porous glass body a peripheral portion of which has a larger bulk density than other portion and a cladding part porous glass body, heating said porous glass preform in a dehydration atmosphere while supplying a dehydration gas through the pipe form starting member and heating and vitrifying the dehydrated porous glass preform in an atmosphere containing a fluorine-containing compound to selectively add fluorine to the cladding part to obtain a transparent preform.

DETAILED DESCRIPTION OF THE INVENTION

In one preferred embodiment of the method according to the present invention, to increase the bulk density of the peripheral portion of the core part porous glass body, said portion is heated by a part of the flame generated by the burner for synthesizing the cladding part porous glass body or by an additional burner for sintering the glass provided between the burners for synthesizing the core part and cladding part porous glass bodies.

To overcome the difficulty to dehydrate the core part of the core-cladding porous preform in which the peripheral portion of the core part has a larger bulk density produced by the conventional method, according to the present invention, the dehydration gas is supplied directly to the core part since the inner portion of the core part is still porous and has a bulk density less than about 0.5 g/cm$^3$ while the peripheral portion of the core part has the larger bulk density. This is contrary to the above described conventional method in which the dehydration gas is supplied to the core part through the outer portion of the porous glass preform, namely the cladding part.

To this end, the present invention uses the pipe form starting member in place of a glass rod starting member which is conventionally used. The glass soot is deposited on the pipe form starting member, and the pipe form starting member is used as a gas inlet tube for supplying the dehydration gas to the core part.

In the method of the present invention, although the additional burner for sintering the core part porous glass body may be used, the bulk density of the peripheral portion of the core part can be adjusted by heating said portion by a part of the flame of the burner for producing the cladding part.

The present invention will be illustrated by making reference to the accompanying drawings.

Figure 1:
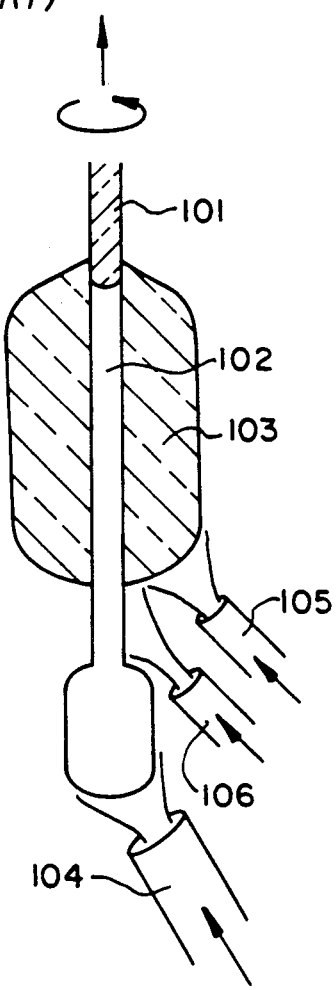
FIG. 1 schematically shows a conventional method for depositing glass soot on a starting member, FIG. 2 schematically shows one embodiment of a soot deposition step of the method according to the present invention.
Figure 2:
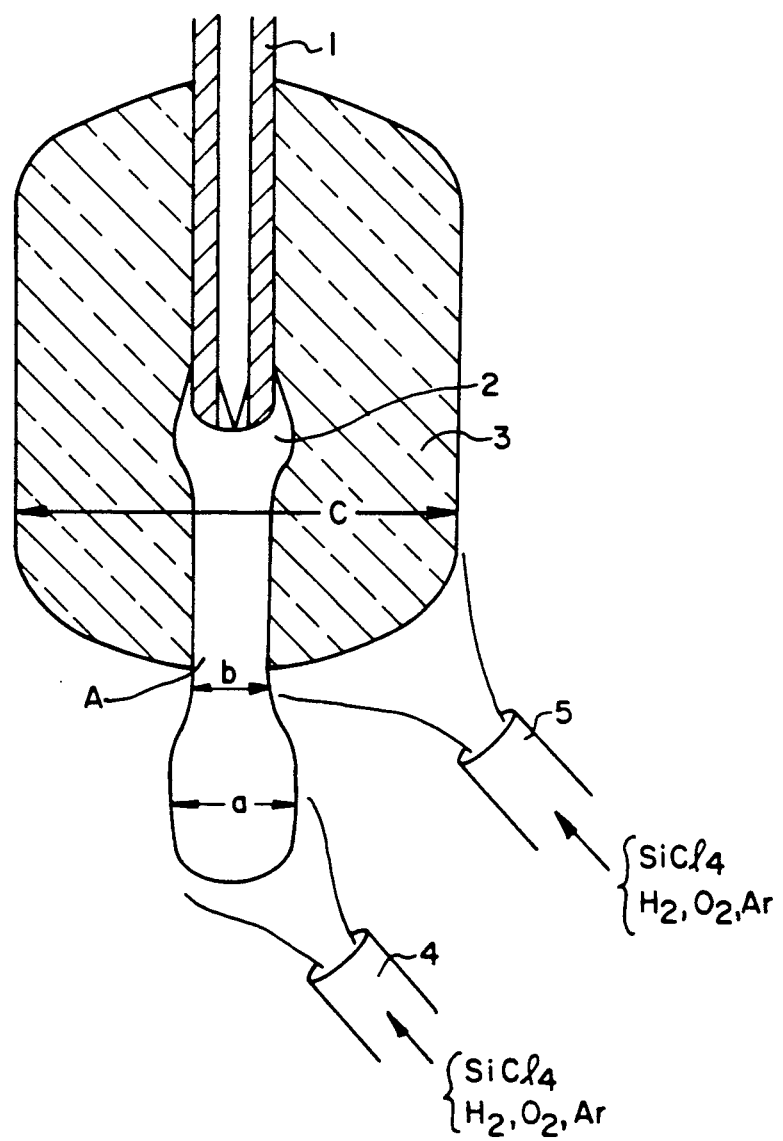
Figure 3:
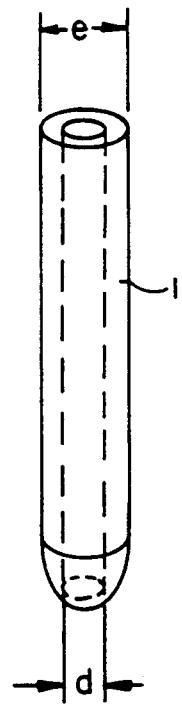
FIG. 3 shows a pipe form starting member to be used according to the present invention, FIG. 4 schematically shows a furnace to be used for dehydration, fluorine-addition and vitrification of the porous glass preform.

FIG. 2 schematically shows one embodiment of a soot deposition step in the method of the present invention. A starting member 1 is a pipe form member as shown in FIG. 3. When the pipe has a tapered tip end of about 45° as shown in FIG. 3, the glass soot is easily deposited on the tip end. In FIG. 2, the references 4 and 5 stand for a burner for synthesizing the core part porous glass and a burner for synthesizing the cladding part porous glass. To each burner, a glass forming raw material such as $SiCl_4$, fuel and combustion improving gases such as oxygen ($O_2$) and hydrogen ($H_2$) and an inert gas such as helium (He) and argon (Ar) are supplied, and the glass forming raw material is flame hydrolyzed in the burner flame to generate glass soot, which is deposited on the starting member 1. In the method of the present invention, the core part porous glass (soot) body 2 is grown by the burner 4 from the lower end of the starting member 1 in the axial direction of the starting member 1. When the core part is grown to a suitable size, a cladding part porous glass (soot) body 3 is deposited around the core part soot body 2 by the burner 5. In this step, the core part soot body 2 is partly sintered by the flame of the burner 5 so that the bulk density of the peripheral portion of the core part is increased. Particularly, the peripheral portion of the region A in FIG. 2 is heated to about 1,200° C. so that the bulk density of said peripheral portion becomes very large.

Figure 4:
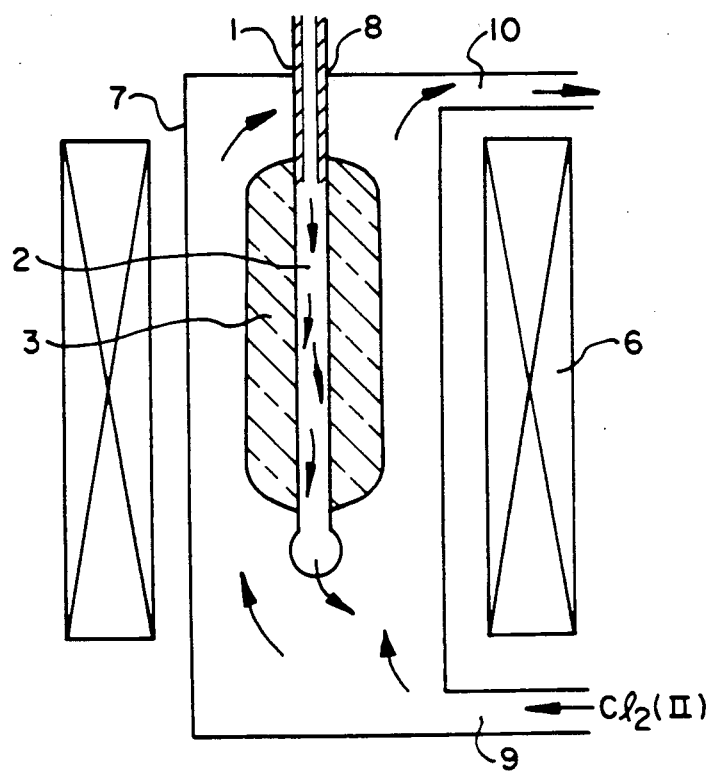

The core-cladding porous glass preform produced in the above step is heated to dehydrate the preform, add fluorine and vitrify it in a furnace such as shown in FIG. 4.

The porous glass preform is inserted in a muffle tube 7 of the furnace which has a heater 6 with the pipe form starting member 1 extending from the muffle tube through an upper opening 8 made in an upper wall of the muffle tube 7. In the dehydration step, the porous glass preform is heated by the heater while introducing the dehydration gas from a gas inlet 9 which is connected to a lower part of the muffle tube 7 to dehydrate mainly the cladding part soot body 3. Simultaneously, the dehydration gas is supplied through the pipe form starting member 1 to dehydrate mainly the core part soot body 2. The gas flows in this step are indicated by arrows. The gas is exhausted from a gas outlet 10. For the dehydration, gas, chlorine ($Cl_2$) and chlorine containing compounds such as $SOCl_2$ and $CCl_4$ are preferred.

The dehydration temperature should not be so high as to vitrify the porous glass preform, and it varies with the kind of glass. Usually, the dehydration temperature is from 900° to 1,200° C.

After the dehydration step, fluorine is added to the cladding part and then the porous glass preform is vitrified. When the dehydration is completed, the supply of the dehydration gas from the inlet 9 and the pipe form starting member is stopped, and a mixture of a fluorine-containing compound and an inert gas is introduced from the inlet 9 and the temperature is raised by the heater 6. Since the peripheral portion of the core part soot body 2 has a larger bulk density than other portion, a transparent glass preform consisting of the cladding part 3 to which fluorine is selectively added is obtained.

The temperature in the fluorine-addition and vitrification step is usually from 1,200° to 1,650° C.

Examples of the fluorine-containing compound are $SF_6$, $CCl_2F_2$, $CF_4$, $C_2F_6$ and $SiF_4$. Examples of the inert gas are helium, argon and nitrogen. To obtain the transparent glass preform containing no residual bubbles, helium is preferred since it is easily dissolved in the glass.

Since the amount of added fluorine depends on a concentration of the fluorine-containing compound in the furnace during the fluorine-addition step, flow rates of the fluorine-containing compound and the inert gas from the inlet 9 are suitable adjusted to achieve the desired amount of fluorine to be added to the cladding.

PREFERRED EMBODIMENT OF THE INVENTION

The present invention will be explained by following Examples, which do not limit the scope of the present invention.

EXAMPLE

By using a pure $SiO_2$ glass pipe member of FIG. 3 in which diameters "d" and "e" were 5 mm and 15 mm, respectively, the core-cladding porous glass preform was produced in the method of FIG. 2. The supply amounts of the gases to the burners 4 and 5 were as follows:

| Burner 4 | |
|---|---|
| $SiCl_4$: | 80 cc/min. |
| $H_2$: | 3.5 l/min. |
| $O_2$: | 10 l/min. |
| Ar: | 2 l/min. |
| Burner 5 | |
| $SiCl_4$: | 800 cc/min. |
| $H_2$: | 30 l/min. |
| $O_2$: | 35 l/min. |
| Ar: | 15 l/min. |

Figure 5:
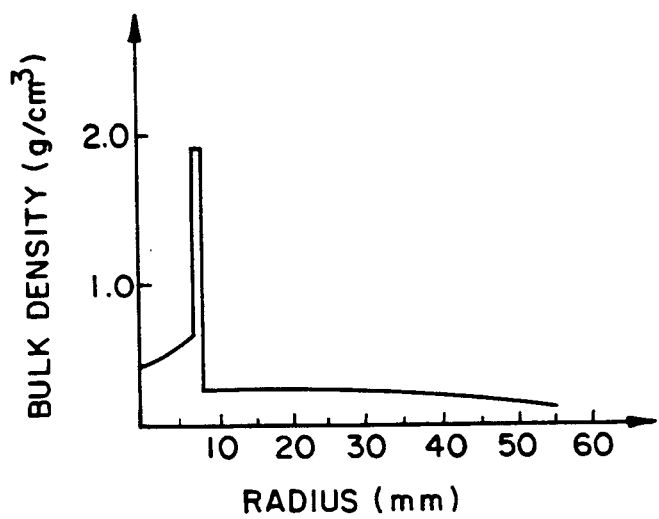
FIG. 5 is a graph showing a distribution of the bulk density in a radial direction of the core-cladding porous glass preform produced in Example.

In a stationary state of soot deposition shown in FIG. 2, diameters "a", "b" and "c" were 20 mm, 15 mm and 110 mm, respectively. A distribution of the bulk density (g/cm³) in a radial direction of the produced core-cladding porous glass preform is shown in FIG. 5, which shows that the bulk density of the peripheral portion of the core part was sharply increased.

The core-cladding porous glass preform was inserted in the furnace of FIG. 4 and subjected to the dehydration, fluorine-addition and vitrification treatments.

In the dehydration step, from the pipe form starting member 1, $Cl_2$ as a dehydration gas (I) was introduced at a flow rate of 50 cc/min., and from the gas inlet 9, $Cl_2$ as a dehydration gas (II) and He were introduced at flow rates of 600 cc/min. and 10 l/min., respectively. The furnace temperature was raised from 800° C. to 1,050° C. at a heating rate of 5° C./min. and kept at 1,050° C. for "T" hours. The period of time "T" was changed for each porous glass preform. Thereby, the porous glass preform was dehydrated.

Then, the supply of the dehydration gas (I) was stopped, and from the gas inlet 9, $SiF_4$ and He were supplied at flow rates of 300 cc/min. and 10 l/min., respectively, and the furnace temperature was raised from 1,050° C. to 1,600° C. at a heating rate of 5° C./min. and kept at 1,600° C. for 15 minutes. Thereby, the preform was vitrified with the selective addition of fluorine to the cladding part.

Figure 6:
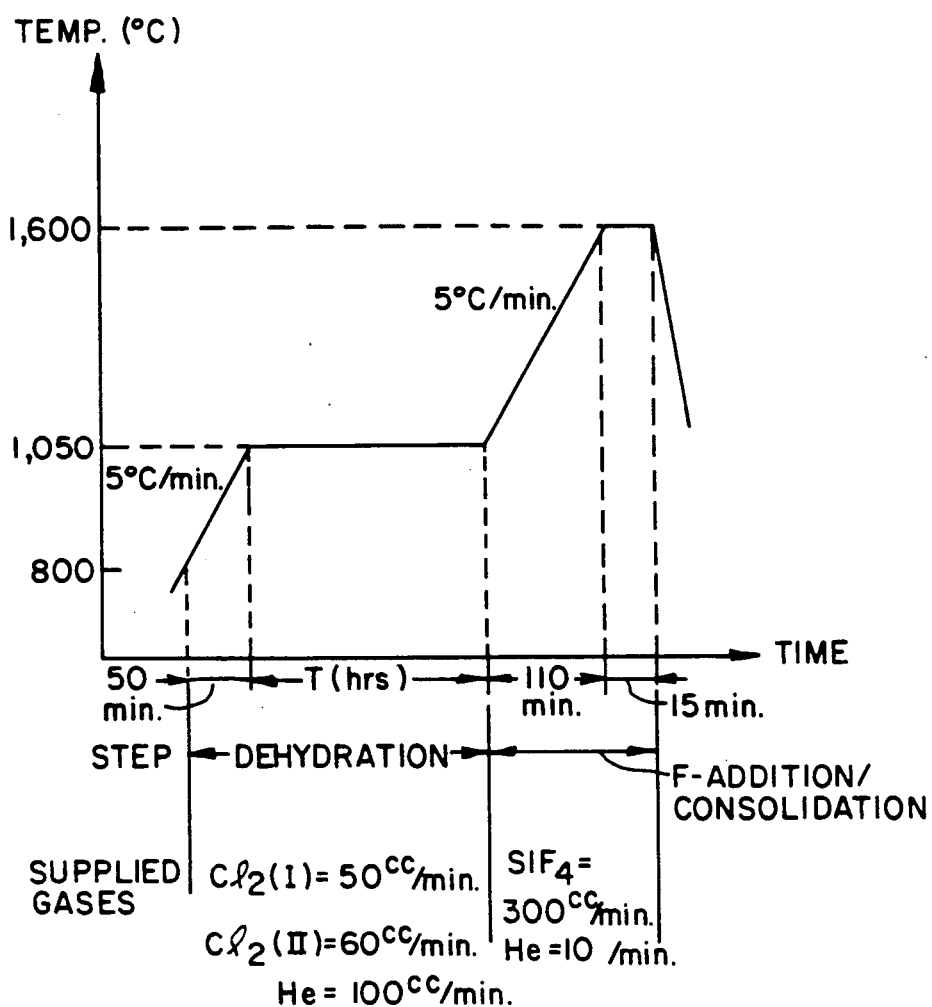
FIG. 6 shows the conditions used in Example.

The conditions in the above steps are summarized in FIG. 6.

Figure 7:
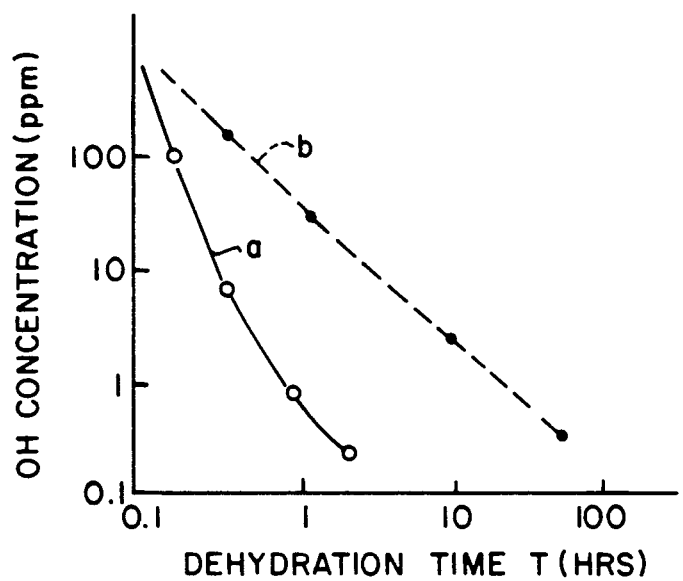
FIG. 7 is a graph showing a relationship between the dehydration time (T) and the residual OH concentration of the glass preforms produced in Example and Comparative Example.

Each transparent glass perform was sliced to prepare a sample having a thickness of about 10 mm and analyzed by an infrared absorbing analysis to measure a residual OH concentration (ppm). The relationship between the dehydration time (T) and the residual OH concentration is shown by a solid curve "a" (with open circles) FIG. 7. By the dehydration for about 3 hours, the residual OH concentration can be reduced to near a limit of detection, namely about 0.2 ppm.

Figure 8:
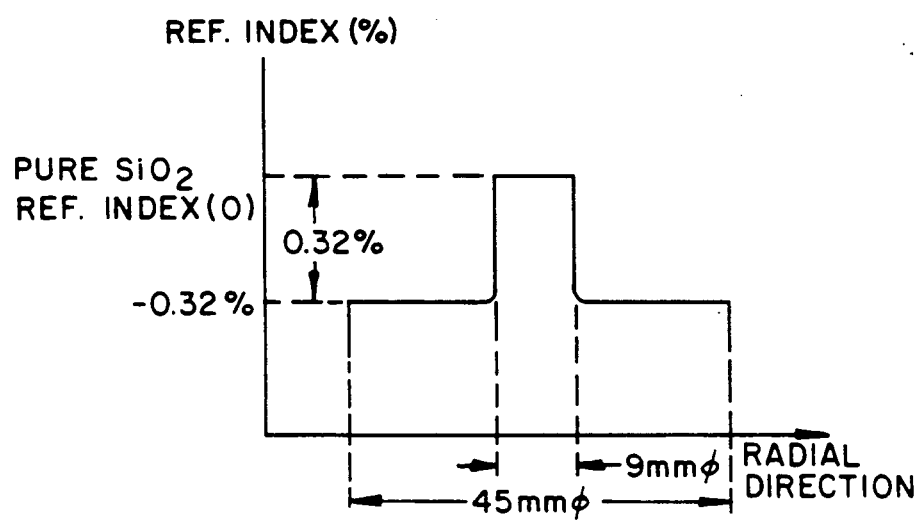
FIG. 8 shows a refractive index and diameters of the glass preform produced in Example, FIG. 9 schematically shows the step for depositing glass soot around the transparent glass rod having the refractive index profile of FIG. 8.

A refractive index profile and a diameter of each part of the transparent glass preform which was dehydrated for 3 hours are shown in FIG. 8. In comparison with the refractive index of pure $SiO_2$, the cladding part had a specific refractive index of $-0.32\%$.

Figure 9:
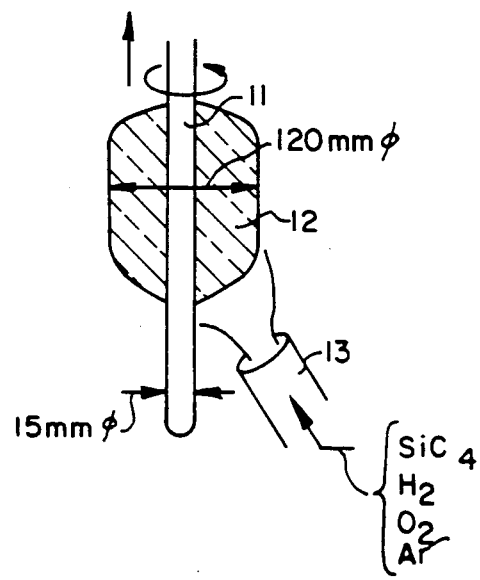
Figure 10:
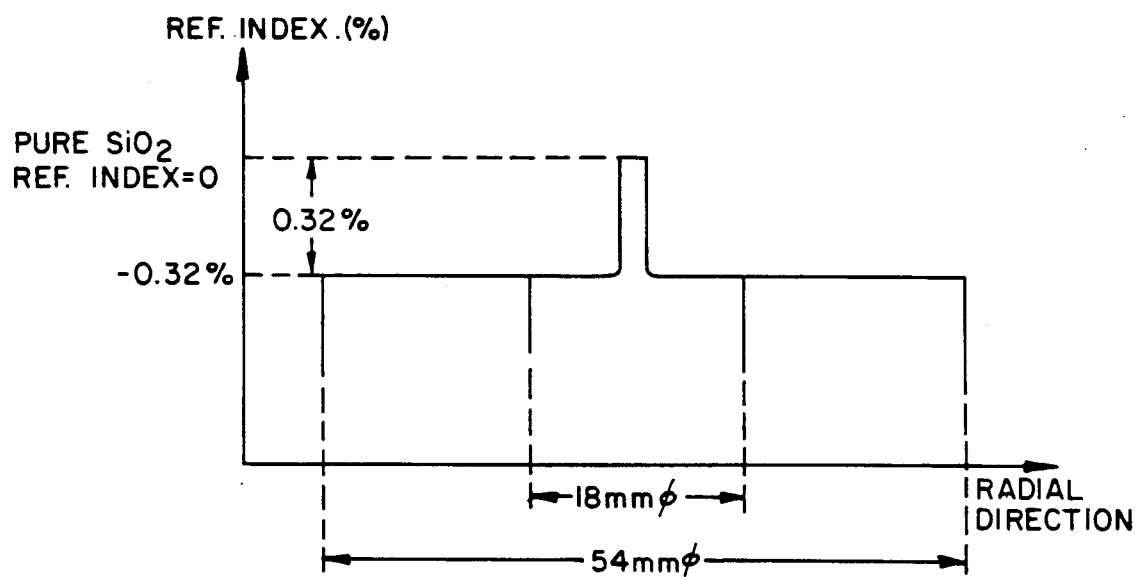
FIG. 10 shows a refractive index and diameter of the glass preform finally produced in Example.

This transparent glass preform was drawn to an outer diameter of 11 mm by an oxyhydrogen flame. Then, as shown in FIG. 9, around the periphery of the drawn preform 11, soot of pure $SiO_2$ 12 was deposited to an outer diameter of 120 mm. To a burner 13, $SiCl_4$, $H_2$, $O_2$ and Ar were supplied at flow rates of 1,200 cc/min., 35 l/min., 35 l/min. and 15 l/min., respectively. A produced glass rod/soot composite was subjected to dehydration, fluorine addition and vitrification to produce a glass preform having a refractive index profile and diameters shown in FIG. 10. In the dehydration step, the composite was heated from 800° C. to 1,050° C. at a heating rate of 5° C./min. while supplying $Cl_2$ and He at flow rates of 600 cc/min and 10 l/min., respectively to the furnace and kept at 1,050° C. for 30 minutes. Then, the dehydrated composite was heated from 1,050° C. to 1,600° C. at a heating rate of 5° C./min. while supplying $SiF_4$ and He at flow rates of 300 cc/min. and 10 l/min., respectively and kept at 1,600° C. for 15 minutes to add fluorine to the soot and vitrify it.

The produced preform was drawn to fabricate a fiber having an outer diameter of 125 μm. The fabricated optical fiber was a low loss single mode optical fiber and had transmission loss of 0.45 dB/km at a wavelength of 1.3 μm and of 0.25 dB/km at a wavelength of 1.55 μm and OH absorption loss of 10 dB/km at a wavelength of 1.38 μm.

COMPARATIVE EXAMPLE

In the same manner as in Example but using, as a starting member, a pure $SiO_2$ glass rod having an outer diameter of 15 mm and supplying no dehydration gas (I) in the dehydration step, transparent glass preforms were produced with varying the dehydration time. A residual OH concentration of a sliced sample having a thickness of about 10 mm was measured by the same method as in Example. The results are shown by a dashed line "b" (with solid circles) in FIG. 7. In comparative Example, the OH concentration could be satisfactorily reduced only after about 100 dehydration. Therefore, the method of Comparative Example cannot be practically employed.

As described above, according to the present invention, the porous glass preform is produced in a single step, the OH content in the core and cladding parts is satisfactorily reduced in the dehydration step which takes much shorter time than the conventional method, and fluorine is selectively added to the cladding part.

By the method according to the present invention, an optical fiber which contains no or a small amount of refractive index-increasing additive such as GeO$_2$ in the core is easily fabricated. Thereby, the optical fiber fabricated from the glass preform produced according to the present invention has good radiation resistance and low transmission loss, since he refractive index-increasing additive in the core deteriorates the radiation resistance and increases the transmission loss of the optical fiber. In addition, such optical fiber is advantageously used for long distance communication or in a radiation filled atmosphere.

What is claimed is:

1. A method for producing a glass preform for an optical fiber, said method comprising the steps of:

depositing soot of quartz glass by a vapor phase axial deposition method on a pipe starting member having an axial bore which pipe extends lengthwise in the same direction as a growth direction of the glass soot to be deposited by the vapor phase axial deposition method, the axial deposition being effected by using a plurality of burners for synthesizing glass soot so as (a) to axially deposit a core porous glass body on one end of the pipe starting member using a burner and (b) to axially deposit a cladding porous glass body around the core porous glass body using a different burner to thereby form a porous glass preform consisting of the cladding porous glass body and the core porous glass body, where burners are arranged and sufficient amounts of reactants are fed to the burners so that the entire periphery of the core porous glass body has a larger bulk density than the core internal portion;

said depositing step resulting in the core extending axially from said one end of the pipe starling member such that gas can flow from the exit of the axial bore at said one end of said pipe into and through said core;

heating said porous glass preform in a dehydration gas atomsphere while also supplying a dehydration gas through said axial bore of said pipe, from the exit of said axial bore of the pipe directly into the core internal portion and through the internal portion of the core porous glass body;

heating the resulting dehydrated porous glass preform in an atmospher containing a fluorine-containing gaseous compound to selectively add fluorine to the cladding porous glass body; and vitrifying the resulting fluorine-added porous glass preform to obtain a transparent preform for an optical fiber.

2. The method according to claim 1, wherein one of the plurality of burners is sued to increase the bulk density of the periphery of the core porous glass body.

* * * * *